US011952484B2

United States Patent
Hung et al.

(10) Patent No.: US 11,952,484 B2
(45) Date of Patent: Apr. 9, 2024

(54) ELECTRICAL RESPONSIVE GRAPHENE-PVDF MATERIAL AND THE MANUFACTURING METHOD THEREOF

(71) Applicant: NATIONAL TAIWAN UNIVERSITY OF SCIENCE AND TECHNOLOGY, Taipei (TW)

(72) Inventors: Wei-Sung Hung, Taipei (TW); Jian-Xiang Huang, Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 304 days.

(21) Appl. No.: 17/317,939

(22) Filed: May 12, 2021

(65) Prior Publication Data

US 2022/0363884 A1  Nov. 17, 2022
US 2023/0235157 A9  Jul. 27, 2023

(30) Foreign Application Priority Data

Jun. 19, 2020 (TW) .................. 109120699

(51) Int. Cl.
| C08L 27/08 | (2006.01) |
| C08J 5/18 | (2006.01) |
| C08L 27/16 | (2006.01) |
| C09D 127/16 | (2006.01) |
| C08K 3/04 | (2006.01) |

(52) U.S. Cl.
CPC ............. *C08L 27/08* (2013.01); *C08J 5/18* (2013.01); *C08L 27/16* (2013.01); *C09D 127/16* (2013.01); *C08J 2327/08* (2013.01); *C08K 3/042* (2017.05); *C08K 2201/001* (2013.01); *C08L 2203/20* (2013.01)

(58) Field of Classification Search
CPC ........ C08L 27/16; C09D 127/16; C08K 3/042
See application file for complete search history.

(56) References Cited

U.S. PATENT DOCUMENTS

| 2002/0076360 A1* | 6/2002 | Ingman .................... C05D 9/00 422/5 |
| 2002/0091311 A1* | 7/2002 | Eppstein ............... A61M 37/00 604/20 |
| 2016/0267897 A1* | 9/2016 | Wu ....................... E04B 1/8209 |

FOREIGN PATENT DOCUMENTS

WO    WO-2018085936 A1 *  5/2018  ........... B29C 64/106

OTHER PUBLICATIONS

"Micro-pore" IUPAC gold book (Year: 2014).*

* cited by examiner

*Primary Examiner* — Mark S Kaucher
(74) *Attorney, Agent, or Firm* — McClure, Qualey & Rodack, LLP

(57) ABSTRACT

An electrical responsive graphene-PVDF material and the manufacturing method thereof is disclosed in the present invention. The method includes three steps. Firstly, prepare a mother solution of PVDF. Then, add graphene powders into the mother solution of PVDF to prepare a graphene-PVDF slurry. At last, remove the solvent from the graphene-PVDF slurry to directly form an electrical responsive graphene-PVDF material. Due to the ability of transforming the non-electrical energy into the electrical energy, the electrical responsive graphene-PVDF material can be formed for many different applications in the form of individual film or of film with a substrate via various film formation methods.

12 Claims, 3 Drawing Sheets

ELECTRICAL RESPONSIVE GRAPHENE-PVDF MATERIAL AND THE MANUFACTURING METHOD THEREOF

TECHNICAL FIELD

Example embodiments relate generally to the field of electrical responsive structure and the manufacturing method thereof and, more particularly, to electrical responsive graphene-PVDF material and the manufacturing method thereof.

BACKGROUND

Since the piezoelectric effect was discovered on quartz crystals, piezoelectric materials have begun to attract widespread attention. With the intense of study of materials, a large number of piezoelectric materials have been discovered, such as ceramic materials, polymer piezoelectric films, and piezoelectric composite materials. These materials can be applied in various areas, and play an important role in the energy conversion devices of electricity, magnetism, sound, light, heat, humidity, gas, and force.

Piezoelectric materials can convert mechanical energy into electrical energy. More clearly, piezoelectric materials have the ability to generate an electric charge in response to mechanical stress such as bending, stretching, or other mechanical forces, and vice versa. That is, if the material is supplied with electrical energy, the material will deform accordingly. Nowadays, piezoelectric materials are mainly focused on the application of energy harvesting, artificial muscles and sensors. Piezoelectric materials are widely used in electronic devices. For example, piezoelectric materials can be applied in speakers. The initial mechanical motion is created by applying a voltage to a piezoelectric material, and this motion will generate sound waves which are converted into audible sound.

Generally, piezoelectric material is a kind of dielectric that can be polarized under pressure and cause a potential difference between the two end surfaces of the piezoelectric material. When applying a stress in a specific direction of the heteropolar crystal material, positive bound charges and negative bound electrons will appear on corresponding surfaces of the crystal. The charge density will be correspondingly to the magnitude of the applied stress. The effect of polarizing the dielectric by mechanical stress and forming a charge on the crystal surface is called the piezoelectric effect. Piezoelectric effect can be reversed, which is referred to as the inverse piezoelectric effect. This is created by applying electrical voltage to make a piezoelectric crystal shrink or expand. The inverse piezoelectric effect converts electrical energy to mechanical energy. Also, when the stress is reversed, the charge changes from positive/negative to negative/positive.

Common piezoelectric materials can be divided into natural materials and artificial materials. Natural piezoelectric materials include Berlin iron ore, sucrose, quartz, Rochelle salt, topaz, tourmaline, etc., while artificial piezoelectric materials include barium titanate and lead zirconate titanate. In recent years, due to international concerns about the toxicity of lead-containing equipment, the development of lead-free piezoelectric materials has been gradually promoted, and new piezoelectric materials that are more environmentally friendly have been produced.

Among the lead-free piezoelectric materials, polyvinylidene fluoride (PVDF) polymer is composed of $-(CH_2CF_2)_n-$, which has advantages such as low friction coefficient, high chemical resistance, and good flexibility. PVDF polymer often used in the food processing industry, petrochemical industry, electronic and electrical industries. In addition, PVDF has excellent electrical properties, high insulation, high dielectric strength, etc., so it is widely used as piezoelectric material.

PVDF polymer is a long-chain molecule bonded by CFCH. According to the characteristics of PVDF polymer, it is a semi-crystalline polymer under normal conditions, and it has four types of crystal forms: α, β, γ, and δ (also including a less-formed c type), which are formed under different conditions and can be transformed into each other under certain conditions such as heat, electric field, mechanical and radiant energy. In these four (or five) crystal forms, β and δ are both polar crystal structures, but the β form PVDF is more popular to be used as piezoelectric material in actual applications due to its crystal stability. The β crystal form generally exists in stretch-oriented PVDF polymer. The molecular chains are regularly arranged and spontaneously polarized. The dielectric constant after orientation increases from 6-8 to 11-14. Therefore, the β crystal form PVDF polymer can be obtained by mechanically stretching the α crystal form PVDF polymer due to the transformation of crystal form.

In a prior art, a PVDF film is prepared by adding graphene oxide and aluminum oxide into PVDF polymer, and polymethyl methacrylate is used as a substrate. However, in the prior art, the graphene oxide and aluminum oxide are using their metal cations to interact with the fluorine in the PVDF to induce the formation of a polarized structure in the PVDF. That is, inducing the α crystal from to become β crystal form in the PVDF. The abovementioned preparation method takes a long time to shape the β crystal from in the PVDF, so the preparation efficiency is not good enough to meet market expectations.

In another prior art, the fiber structure is used as the substrate, graphene and PVDF are added to prepare a material that can enhance the output current. However, under this preparation method, to shape the β crystal from in the PVDF, it is necessary to use a high-voltage polarization field, and therefore it needs to consume a lot of energy.

In view of the above-mentioned problems, the present invention provides an electrical responsive graphene-PVDF material and the manufacturing method thereof, so as to solve the problems in the prior art that require a lot of preparation time and a lot of energy.

SUMMARY

One of the object of the present invention is to provide an electrical responsive graphene-PVDF material and the manufacturing method thereof. During the production process, graphene is added to the solution of PVDF for mixing, and the π-π conjugated bond of graphene is used to directly or indirectly induce the alignment of PVDF polymer chains. Therefore, developing a composite material that can convert non-electrical energy into electrical energy and has characteristic of immediately response.

One of the object of the present invention is to provide an electrical responsive graphene-PVDF material and the manufacturing method thereof. When the electrical responsive graphene-PVDF material is prepared from the graphene-PVDF slurry, only need to remove the organic solvent from the graphene-PVDF slurry. More clearly, the electrical responsive graphene-PVDF material is directly formed without applying additional voltage or mechanical energy.

One of the object of the present invention is to provide an electrical responsive graphene-PVDF material and the manufacturing method thereof. The electrical responsive graphene-PVDF material generates charges under stress, and output the charges through the conductive micro-bodies of the electrical responsive graphene-PVDF material. Therefore, the electrical responsive graphene-PVDF material of the present invention can not only output electricity through an additional electrode structure, but also can output the charge generated by the piezoelectric effect by itself because its own electrical conductivity characteristics.

One of the object of the present invention is to provide an electrical responsive graphene-PVDF material and the manufacturing method thereof. Since the electrical responsive graphene-PVDF material can be directly formed, electrical responsive graphene-PVDF material can apply with electronic components directly, also, an electrode can be additionally formed on the surface of the electrical responsive graphene-PVDF material.

One of the object of the present invention is to provide an electrical responsive graphene-PVDF material and the manufacturing method thereof. In the electrical responsive graphene-PVDF material, different polymers and/or ceramic materials and/or semiconductor materials can be added, so that the electrical responsive graphene-PVDF material can be applied to different manufacturing processes and achieve different piezoelectric properties. For example, by adding UV curable material to meet the requirement of 3D printing molding, or molding methods such as mold molding, injection molding, or by adding ceramic materials and/or semiconductor materials to adjust the piezoelectric characteristics.

To meet the abovementioned objects, the present invention provides an electrical responsive graphene-PVDF material and the manufacturing method thereof. First, preparing a mother solution via mixing PVDF and an organic solvent at a first temperature. Then, preparing a graphene-PVDF slurry via adding and mixing a plurality of graphene powders into the mother solution at a second temperature. At last, forming an electrical responsive graphene-PVDF material directly via removing the organic solvent from the graphene-PVDF slurry. Wherein in the step of forming the electrical responsive graphene-PVDF material, the electrical responsive graphene-PVDF material is directly formed without applying an additional voltage.

In some embodiments, wherein before adding the graphene powders to the mother solution, the viscosity of the mother solution is further detected, and when the viscosity of the mother solution is between 1.2-1.8 Pa·s, stop mixing PVDF and the organic solvent.

In some embodiments, wherein in the step of adding and mixing the graphene powders into the mother solution at the second temperature, stop mixing the graphene-PVDF slurry when the viscosity of the graphene-PVDF slurry is between 2.0-2.5 Pa·s.

In some embodiments, wherein after forming the electrical responsive graphene-PVDF material directly, detecting a weight percentage of β crystal form PVDF of the electrical responsive graphene-PVDF material, and the weight percentage of β form PVDF is not less than 60%.

In some embodiments, wherein the thickness of the electrical responsive graphene-PVDF material is between 100 μm and 500 μm.

In some embodiments, wherein the first temperature is between 50° C. and 100° C., and the second temperature is between 5° C. and 10° C.

In some embodiments, wherein when mixing PVDF and the organic solvent at the first temperature, a UV curable resin is further added into the mother solution, and before adding the graphene powders into the mother solution, the viscosity of the mother solution is further detected, and when the viscosity of the mother solution is between 1.2-1.8 Pa·s, stop mixing PVDF, the UV curable resin and the organic solvent.

In some embodiments, wherein when adding the graphene powders into the mother solution, further adding ceramic material and/or semiconductor material into the mother solution, and when the viscosity of the graphene-PVDF slurry is between 2.0-2.5 Pa·s, stop mixing the ceramic material and/or semiconductor material added graphene-PVDF slurry.

To meet the abovementioned objects, the present invention provides an electrical responsive graphene-PVDF material, applying to convert at least a non-electrical energy into electrical energy, the electrical responsive graphene-PVDF material includes a first electron conducting end and a second electron conducting end. The electrical responsive graphene-PVDF material comprises a polymer carrier and a plurality of conductive micro-bodies. The polymer carrier included PVDF polymer and has a plurality of micro-pores. The conductive micro-bodies include graphene powder, the conductive micro-bodies are embedded in the polymer carrier and on at least part of the surface of the micro-pores, and the conductive micro-bodies provide at least a first conductive path to the first electron conducting end and provide at least a second conductive path to the second electron conducting end, the electrical responsive graphene-PVDF material generates a charge changing after receiving a non-electrical energy input, and outputting a plurality of electrons via passes through at least one of the first conductive path and the second conductive path to at least one of the first electron conducting end and the second electron conducting end. Wherein, the weight percentage of the graphene powder of the conductive micro-bodies is not 50% less than 60% relative to the PVDF polymer of the polymer carrier.

In some embodiments, wherein the weight percentage of the graphene powder of the conductive micro-bodies is preferably not less than 60% relative to the PVDF polymer of the polymer carrier, and when the weight percentage of the graphene powder of the conductive micro-bodies is 60% relative to the PVDF polymer of the polymer carrier, the conductivity of the electrical responsive graphene-PVDF material is about 1.8 S/cm and the resistance value is about 14 ohms.

In some embodiments, wherein the weight percentage of the graphene powder of the conductive micro-bodies is preferably not less than 75% relative to the PVDF polymer of the polymer carrier, and when the weight percentage of the graphene powder of the conductive micro-bodies is 75% relative to the PVDF polymer of the polymer carrier, the conductivity of the electrical responsive graphene-PVDF material is about 6 S/cm and the resistance value is about 1.5 ohms.

In some embodiments, wherein the weight percentage of the graphene powder of the conductive micro-bodies is preferably 100% relative to the PVDF polymer of the polymer carrier, and the conductivity of the electrical responsive graphene-PVDF material is about 18 S/cm and the resistance value is less than 1 ohm.

In some embodiments, wherein PVDF polymer is selected from PVDF, modification PVDF and the combination thereof.

In some embodiments, wherein the weight percentage of β crystal form PVDF of electrical responsive graphene-PVDF material is not less than 60%.

In some embodiments, wherein the polymer carrier is further including resin material, the weight percentage of the resin material is not more than 100% relative to the PVDF polymer, and the resin material can be UV curable resin material.

In some embodiments, further comprising a plurality of piezoelectric micro-bodies, the weight percentage of the piezoelectric micro-bodies is not more than 50% relative to the graphene powder, and the piezoelectric micro-bodies can be ceramic material and/or semiconductor material.

In some embodiments, wherein the conductivity ($d_{33}$) of the electrical responsive graphene-PVDF material is not less than 400 pC/N.

In some embodiments, wherein the first electron conducting end and/or the second electron conducting end are part of electrical responsive graphene-PVDF material.

In some embodiments, further directly coupled to at least an electronic component, and including a positive terminal and a negative terminal, the positive terminal and the negative terminal are respectively coupled to at least one of the first electron conducting end and the second electron conducting end.

In some embodiments, wherein the first electron conducting end and/or the second electron conducting end are electrode structures.

Therefore, an electrical responsive graphene-PVDF material and the manufacturing method thereof is disclosed in the present invention. Using a simple manufacturing process to form an electrical responsive graphene-PVDF material with piezoelectric properties. Due to the high content of graphene in the electrical responsive graphene-PVDF material and the manufacturing method thereof, the β crystal form is induced in a large amount in the PVDF polymer. So that the electrical responsive graphene-PVDF material not only has good piezoelectric properties but also has a good conductivity. Therefore, the electrical responsive graphene-PVDF material can be widely used in different fields.

BRIEF DESCRIPTION OF THE DRAWINGS

Unless specified otherwise, the accompanying drawings illustrate aspects of the innovative subject matter described herein.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

Figure 1:
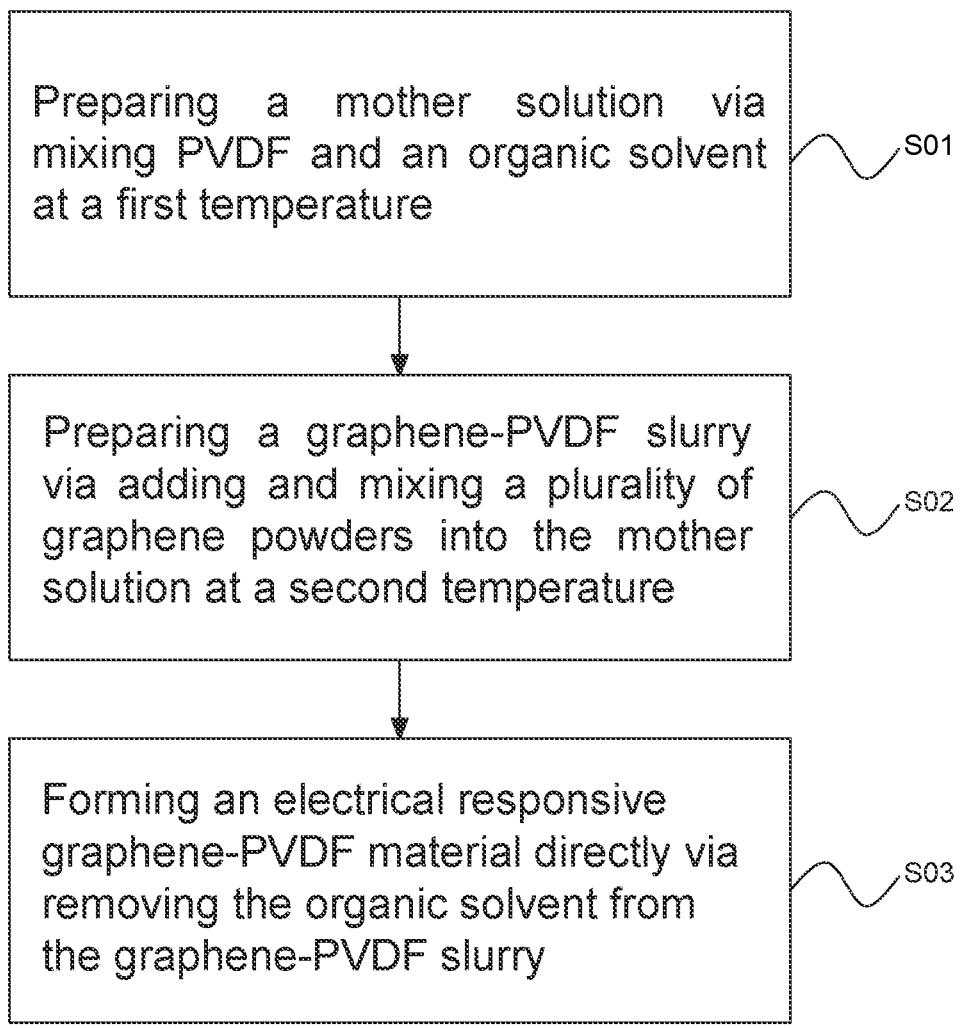
FIG. 1 illustrate a process of manufacturing an electrical responsive graphene-PVDF material according to an example embodiment.

Please refer to FIG. 1, FIG. 1 illustrate a process of manufacturing an electrical responsive graphene-PVDF material according to an example embodiment. The process of manufacturing an electrical responsive graphene-PVDF material comprises the following steps. In step S01, preparing a mother solution via mixing PVDF and an organic solvent at a first temperature. And, in step S02, preparing a graphene-PVDF slurry via adding and mixing a plurality of graphene powders into the mother solution at a second temperature. Last, in step S03, forming an electrical responsive graphene-PVDF material directly via removing the organic solvent from the graphene-PVDF slurry. Wherein in the step S03, the electrical responsive graphene-PVDF material is directly formed without applying an additional voltage.

Furthermore, in step S01, stop mixing PVDF and the organic solvent when he viscosity of the mother solution is between 1.2-1.8 Pa·s. And in step S02, stop mixing the graphene-PVDF slurry when the viscosity of the graphene-PVDF slurry is between 2.0-2.5 Pa·s.

The method for directly forming an electrical responsive graphene-PVDF material in step S03 can be selected from a dry preparation method, a wet preparation method, and a combination thereof. For example, the preparation method of directly forming the electrical responsive graphene-PVDF material is depending on the structure of the material, such as thick film, thin block, thick block, filament. And the preparation method can correspondingly be selected from coating, screen printing, squeegee, rubbing, dipping, spraying, 3D printing, mold molding, injection molding, and a combination thereof.

Figure 2:
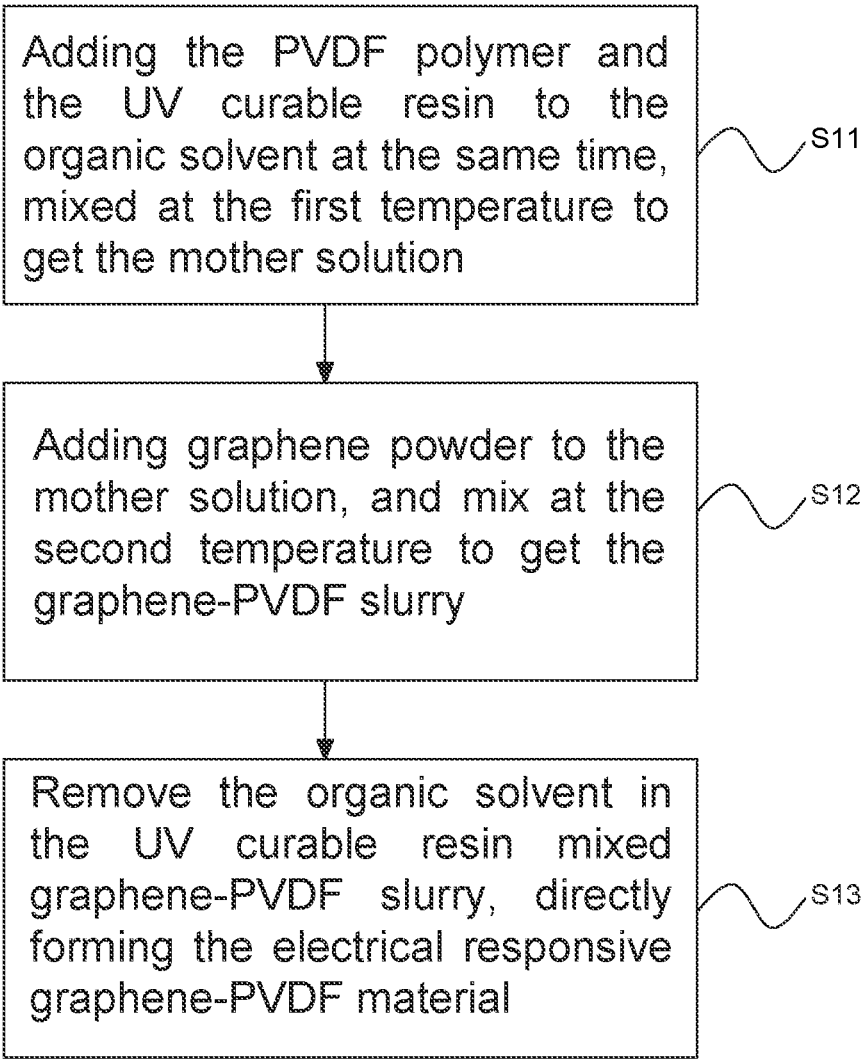
FIG. 2 illustrate a process of manufacturing an electrical responsive graphene-PVDF material according to an example embodiment.

Since the electrical responsive graphene-PVDF material disclosed in the present invention can be prepared by the various preparation methods described above, in a specific manufacturing method, different additives must be added. For example, if the UV curing is needed in the process like in 3D printing, mold molding, injection molding and other process methods, some appropriate resin must be added. Therefore, please refer to the process as shown in FIG. 2, FIG. 2 illustrate a process of manufacturing an electrical responsive graphene-PVDF material according to an example embodiment. In step S11, to get the mother solution, the PVDF polymer and the UV curable resin are added to the organic solvent at the same time, and mixed at the first temperature. Then, in step S12, adding graphene powder to the mother solution, and mix at the second temperature to get the graphene-PVDF slurry which containing the UV curable resin component. Finally, in step S13, remove the organic solvent in the UV curable resin mixed graphene-PVDF slurry, and then directly forming the electrical responsive graphene-PVDF material. The electrical responsive graphene-PVDF material can also form via the process such as 3D printing, mold molding and injection molding. However, in the present invention, the electrical responsive graphene-PVDF material can directly form without applying any additional voltage, no matter in which process of forming.

Furthermore, in step S11, stop mixing PVDF, the UV curable resin and the organic solvent when the viscosity of the mother solution is between 1.2-1.8 Pa·s.

Figure 3:
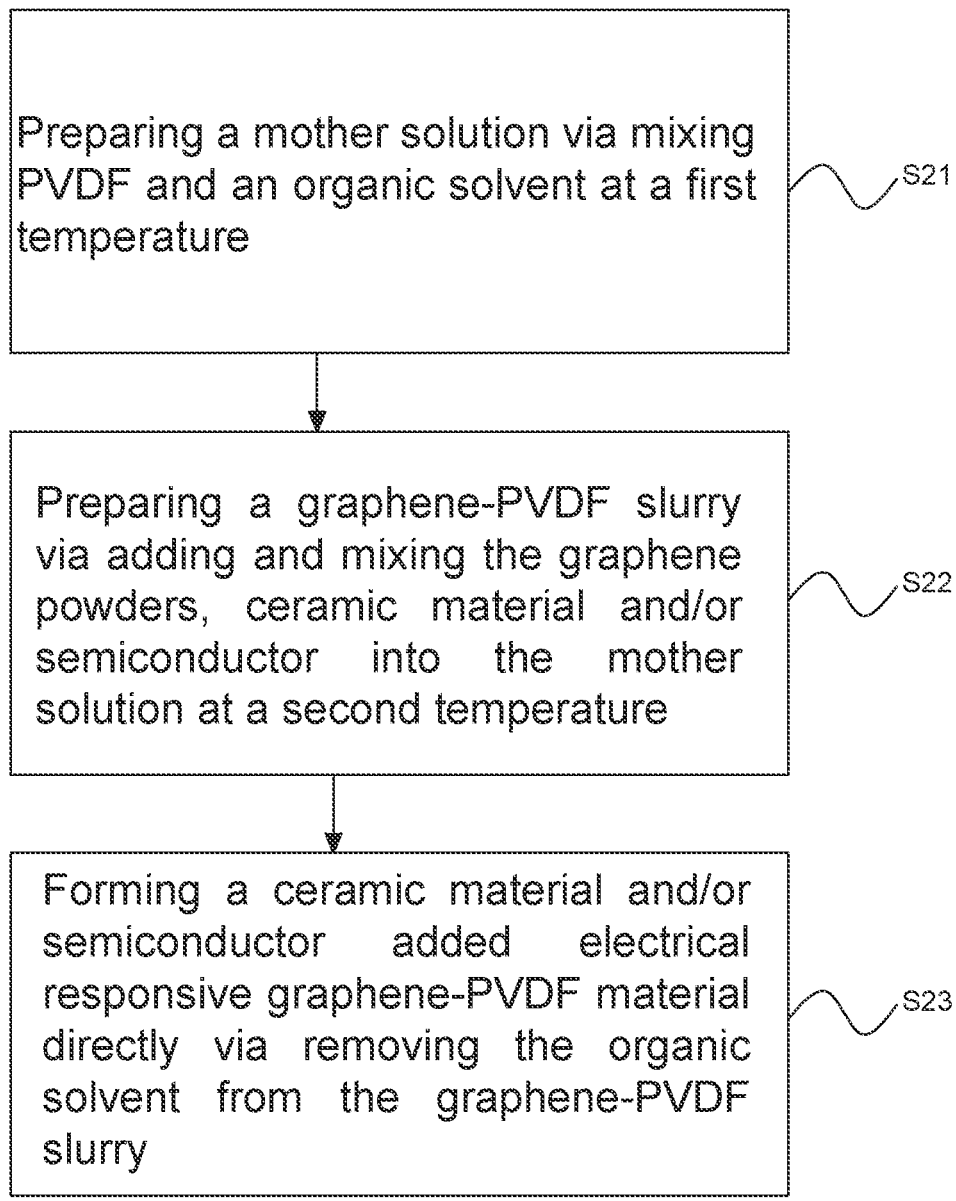
FIG. 3 illustrate a process of manufacturing an electrical responsive graphene-PVDF material according to an example embodiment.

The electrical responsive graphene-PVDF material of the present invention can be applied in various fields. Therefore, piezoelectric constant must be adjusted by adding materials like ceramic material and/or semiconductor material to meet the requirement of application. Please refer to FIG. 3, FIG. 3 illustrate a process of manufacturing an electrical responsive graphene-PVDF material according to an example embodiment. In step S21, preparing a mother solution via mixing PVDF and an organic solvent at a first temperature. Then, in step S22, preparing a graphene-PVDF slurry via adding and mixing the graphene powders, ceramic material and/or semiconductor into the mother solution at a second temperature. At last, in step S23, forming a ceramic material and/or semiconductor added electrical responsive graphene-PVDF material directly via removing the organic solvent from the graphene-PVDF slurry. Wherein in the step S23, the ceramic material and/or semiconductor added electrical responsive graphene-PVDF material is directly formed without applying an additional voltage.

Furthermore, in step S22, stop mixing the ceramic material and/or semiconductor material added graphene-PVDF slurry when the viscosity of the graphene-PVDF slurry is between 2.0-2.5 Pa·s.

In addition, the present invention further discloses an electrical responsive graphene-PVDF material prepared by the abovementioned methods. Due to the characteristic of graphene, the electrical responsive graphene-PVDF material can convert at least a non-electrical energy into electrical energy. The electrical responsive graphene-PVDF material includes a first electron conducting end, a second electron conducting end, a polymer carrier and a plurality of conductive micro-bodies. Wherein, the polymer carrier includes PVDF polymer and has a plurality of micro-pores. The conductive micro-bodies includes graphene powder, the conductive micro-bodies are embedded in the polymer carrier and on at least part of the surface of the micro-pores, and the conductive micro-bodies provide at least a first conductive path to the first electron conducting end and provide at least a second conductive path to the second electron conducting end, the electrical responsive graphene-PVDF material generates a charge changing after receiving a non-electrical energy input, and outputting a plurality of electrons via passes through at least one of the first conductive path and the second conductive path to at least one of the first electron conducting end and the second electron conducting end. Wherein, the weight percentage of the graphene powder of the conductive micro-bodies is not less than 60% relative to the PVDF polymer of the polymer carrier.

In some embodiments, PVDF polymer is selected from PVDF, modification PVDF and the combination thereof. The weight percentage of the graphene powder of the conductive micro-bodies is preferably not less than 60% relative to the PVDF polymer of the polymer carrier. The conductivity ($d_{33}$) of the electrical responsive graphene-PVDF material is not less than 400 pC/N.

In terms of the solid content of the graphene powder, graphene powder is often used as a low-content additive in the prior art. However, the graphene powder accounts for at least half of all solid additives in the electrical responsive graphene-PVDF material in the present invention. The weight percentage of the graphene powder of the conductive micro-bodies is preferably not less than 60% relative to the PVDF polymer of the polymer carrier, and when the weight percentage of the graphene powder of the conductive micro-bodies is 60% relative to the PVDF polymer of the polymer carrier, the conductivity of the electrical responsive graphene-PVDF material is about 1.8 S/cm and the resistance value is about 14 ohms. The weight percentage of the graphene powder of the conductive micro-bodies is preferably not less than 75% relative to the PVDF polymer of the polymer carrier, and when the weight percentage of the graphene powder of the conductive micro-bodies is 75% relative to the PVDF polymer of the polymer carrier, the conductivity of the electrical responsive graphene-PVDF material is about 6 S/cm and the resistance value is about 1.5 ohms. The weight percentage of the graphene powder of the conductive micro-bodies is preferably 100% relative to the PVDF polymer of the polymer carrier, and the conductivity of the electrical responsive graphene-PVDF material is about 18 S/cm and the resistance value is less than 1 ohm.

In terms of the abovementioned UV curable resin, ceramic material and/or semiconductor material added in the method for manufacturing the electrical responsive graphene-PVDF material, the polymer carrier of the electrical responsive graphene-PVDF material is further including resin material, the weight percentage of the resin material is not more than 100% relative to the PVDF polymer. The electrical responsive graphene-PVDF material is further comprising a plurality of piezoelectric micro-bodies, the weight percentage of the piezoelectric micro-bodies is not more than 50% relative to the graphene powder, and the piezoelectric micro-bodies can be ceramic material and/or semiconductor material.

That is, due to the conductive properties of graphene and the piezoelectric properties of PVDF, the electrical responsive graphene-PVDF material has an incredible conductivity that normal piezoelectric materials do not have. Therefore, in order to output the charge generated from the electrical responsive graphene-PVDF material, an additional electrode structure can be formed on the surface of the electrical responsive graphene-PVDF material to serve as the first electron conducting end and the second electron conducting end. However, the electrical responsive graphene-PVDF material of the present invention can directly use the first electron conducting end and the second electron conducting end to output the charges with its own structure. In other words, electrode structure is optional in the present invention. The electrode structure can also be selectively according to different requirements. For example, when an external electronic component is electrically coupled to the electrical responsive graphene-PVDF material of the present invention, the positive terminal and the negative terminal of the electronic component can be respectively coupled to the first electron conducting end and the second electron conducting end of the electrical responsive graphene-PVDF material. Wherein the first electron conducting end and the second electron conducting end can be part of electrical responsive graphene-PVDF material. However, the first electron conducting end and/or the second electron conducting end can be electrode structures.

In some embodiments, the electrical responsive graphene-PVDF material can receive non-electric energy selected from light energy, electrical energy, kinetic energy, concentration difference, stress and a combination thereof.

In the prior art, the piezoelectric structure composed of PVDF or PVDF and ceramic material are mostly film structure. Also, high voltage electricity must be connected with the piezoelectric structure after the piezoelectric materials forming into films to have a great piezoelectric efficiency. That is, without adding high voltage electricity or mechanical stress, the β crystal form will not easily converted from a crystal form in the PVDF polymer. However, it will be not only energy-consuming and time-consuming. In addition, additional electrode structure must be set on the surface of the film. For example, a metal layer is usually added on the two surfaces of a piezoelectric film to form a conductive electrode structure. Therefore, the manufacturing process is relatively complex. It is also easy to cause problems such as peeling and cracking between the electrode structure and the piezoelectric film due to long-term pressing.

However, in the present invention, combining the characteristics of the two materials of graphene and PVDF, electrical responsive graphene-PVDF material can exhibit good and significant piezoelectric efficiency. Also, there is no need to add additional electrode structure on the electrical responsive graphene-PVDF material since it can serve as the electrode and output the charge by itself.

It is worth mentioning that the viscosity is both important in the process of preparing the mother solution and the graphene-PVDF slurry. The viscosity should be controlled in a certain range whether the additive like ceramic material or semiconductor material is added or not in the step of preparing the mother solution and the graphene-PVDF slurry. That is, the viscosity of the mother solution and the graphene-PVDF slurry can not change whether the additive is added or not. The reason is that the shearing force provided by mother solution and slurry determine the uniformity of powder dispersion and the mixing degree of powder and polymer. It is also necessary to control the temperature when preparing the mother solution and the graphene-PVDF slurry. Temperature can affect the solubility of the polymer, that is, if the temperature is changing too fast, the viscosity may change accordingly, and affect the quality of the electrical responsive graphene-PVDF material. If the viscosity of the mother solution and the graphene-PVDF slurry is under control, the π-π conjugated bond of graphene will induce the alignment of PVDF polymer chains to develop a quick electrical responsive material which can convert non-electric energy into electric energy.

The presently disclosed inventive concepts are not intended to be limited to the embodiments shown herein, but are to be accorded their full scope consistent with the principles underlying the disclosed concepts herein. Directions and references to an element, such as "up," "down,", "upper," "lower," "horizontal," "vertical," "left," "right," and the like, do not imply absolute relationships, positions, and/or orientations. Terms of an element, such as "first" and "second" are not literal, but, distinguishing terms. As used herein, terms "comprises" or "comprising" encompass the notions of "including" and "having" and specify the presence of elements, operations, and/or groups or combinations thereof and do not imply preclusion of the presence or addition of one or more other elements, operations and/or groups or combinations thereof. Sequence of operations do not imply absoluteness unless specifically so stated. Reference to an element in the singular, such as by use of the article "a" or "an", is not intended to mean "one and only one" unless specifically so stated, but rather "one or more". As used herein, "and/or" means "and" or "or", as well as "and" and "or." As used herein, ranges and subranges mean all ranges including whole and/or fractional values therein and language which defines or modifies ranges and subranges, such as "at least," "greater than," "less than," "no more than," and the like, mean subranges and/or an upper or lower limit. All structural and functional equivalents to the elements of the various embodiments described throughout the disclosure that are known or later come to be known to those of ordinary skill in the relevant art are intended to be encompassed by the features described and claimed herein. Moreover, nothing disclosed herein is intended to be dedicated to the public regardless of whether such disclosure may ultimately explicitly be recited in the claims. No element or concept disclosed herein or hereafter presented shall be construed under the provisions of 35 USC 112(f) unless the element or concept is expressly recited using the phrase "means for" or "step for".

In view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in the following claims and any claims presented anytime throughout prosecution of this application or any application claiming benefit of or priority from this application.

What is claimed is:

1. An electrical responsive graphene-PVDF material, applying to convert at least a non-electrical energy into electrical energy, the electrical responsive graphene-PVDF material includes a first electron conducting end and a second electron conducting end, and comprising:
   a polymer carrier, including a PVDF polymer and has a plurality of micro-pores;
   a plurality of conductive micro-bodies, including graphene powder, the conductive micro-bodies are embedded in the polymer carrier and on at least part of the surface of the micro-pores, and the conductive micro-bodies provide at least a first conductive path to the first electron conducting end and provide at least a second conductive path to the second electron conducting end, the electrical responsive graphene-PVDF material generates a charge changing after receiving a non-electrical energy input, and outputting a plurality of electrons via passes through at least one of the first conductive path and the second conductive path to at least one of the first electron conducting end and the second electron conducting end;
   wherein, the weight percentage of the graphene powder of the conductive micro-bodies is not less than 60% relative to the PVDF polymer of the polymer carrier; and
   a plurality of piezoelectric micro-bodies, wherein the weight percentage of the piezoelectric micro-bodies is not more than 50% relative to the graphene powder.

2. The electrical responsive graphene-PVDF material of claim 1, wherein the weight percentage of the graphene powder of the conductive micro-bodies is 60% relative to the PVDF polymer of the polymer carrier, the conductivity of the electrical responsive graphene-PVDF material is about 1.8 S/cm and the resistance value is about 14 ohms.

3. The electrical responsive graphene-PVDF material of claim 1, wherein the weight percentage of the graphene powder of the conductive micro-bodies is not less than 75% relative to the PVDF polymer of the polymer carrier, and when the weight percentage of the graphene powder of the conductive micro-bodies is 75% relative to the PVDF polymer of the polymer carrier, the conductivity of the electrical responsive graphene-PVDF material is about 6 S/cm and the resistance value is about 1.5 ohms.

4. The electrical responsive graphene-PVDF material of claim 1, wherein the weight percentage of the graphene powder of the conductive micro-bodies is 100% relative to the PVDF polymer of the polymer carrier, and the conductivity of the electrical responsive graphene-PVDF material is about 18 S/cm and the resistance value is less than 1 ohm.

5. The electrical responsive graphene-PVDF material of claim 1, wherein the PVDF polymer is modification PVDF or a combination of the modification PVDF and PVDF.

6. The electrical responsive graphene-PVDF material of claim 1, wherein the weight percentage of β crystal form PVDF of electrical responsive graphene-PVDF material is not less than 60%.

7. The electrical responsive graphene-PVDF material of claim 1, wherein the polymer carrier is further including resin material, the weight percentage of the resin material is not more than 100% relative to the PVDF polymer, and the resin material is UV curable resin material.

8. The electrical responsive graphene-PVDF material of claim 1, wherein the piezoelectric micro-bodies are ceramic material and/or semiconductor material.

9. The electrical responsive graphene-PVDF material of claim 1, wherein the conductivity ($d_{33}$) of the electrical responsive graphene-PVDF material is not less than 400 pC/N.

10. The electrical responsive graphene-PVDF material of claim 1, wherein the first electron conducting end and/or the second electron conducting end are part of electrical responsive graphene-PVDF material.

11. The electrical responsive graphene-PVDF material of claim 1, further directly coupled to at least an electronic component, and including a positive terminal and a negative terminal, the positive terminal and the negative terminal are respectively coupled to at least one of the first electron conducting end and the second electron conducting end.

12. The electrical responsive graphene-PVDF material of claim 1, wherein the first electron conducting end and/or the second electron conducting end are electrode structures.

\* \* \* \* \*